Aug. 7, 1956  J. W. KREUTTNER  2,757,868
AIR CONDITIONING APPARATUS
Filed March 5, 1954  3 Sheets-Sheet 1
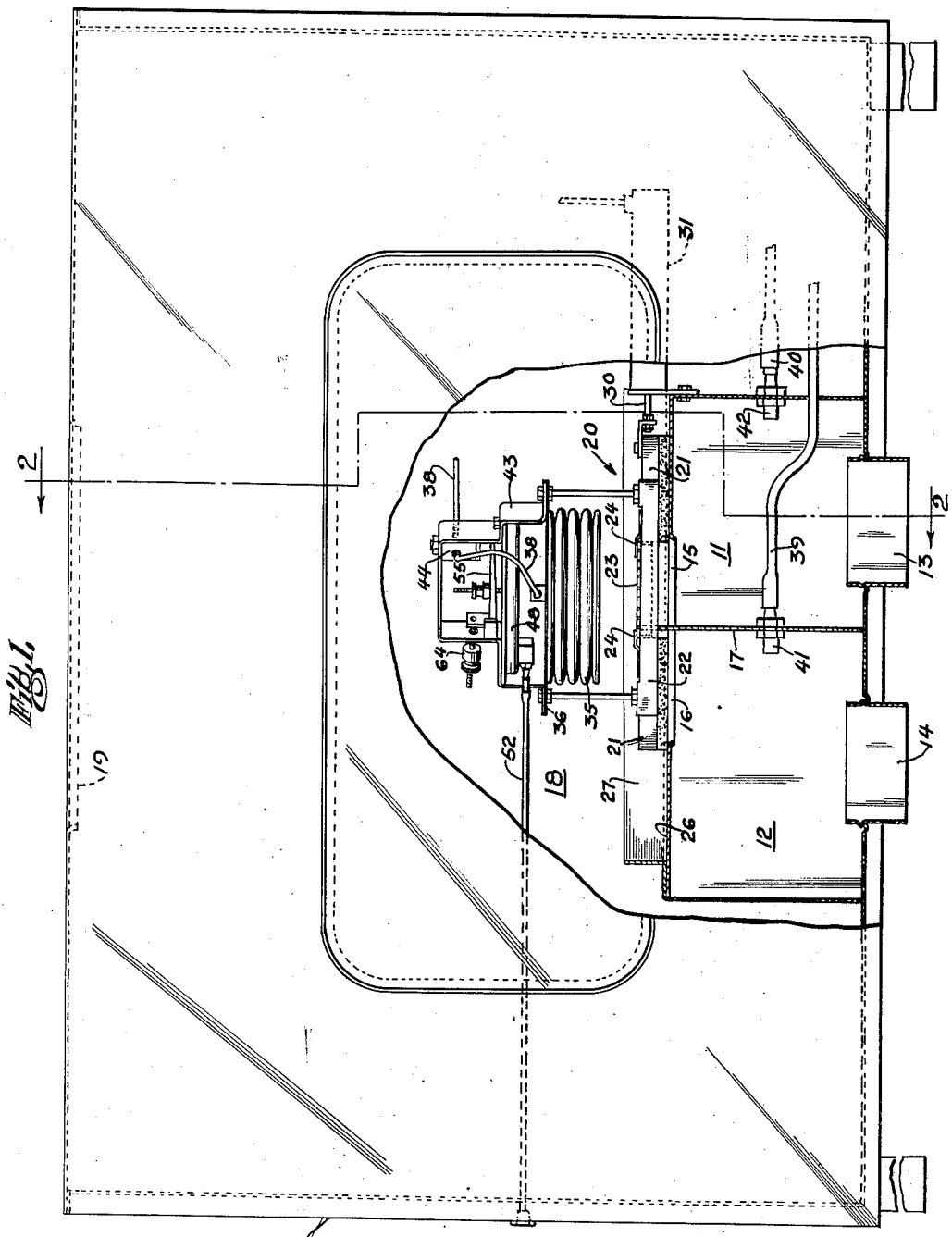
INVENTOR
JOSEPH W. KREUTTNER
BY
Pollard, Johnston, Smythe & Roberts
ATTORNEYS

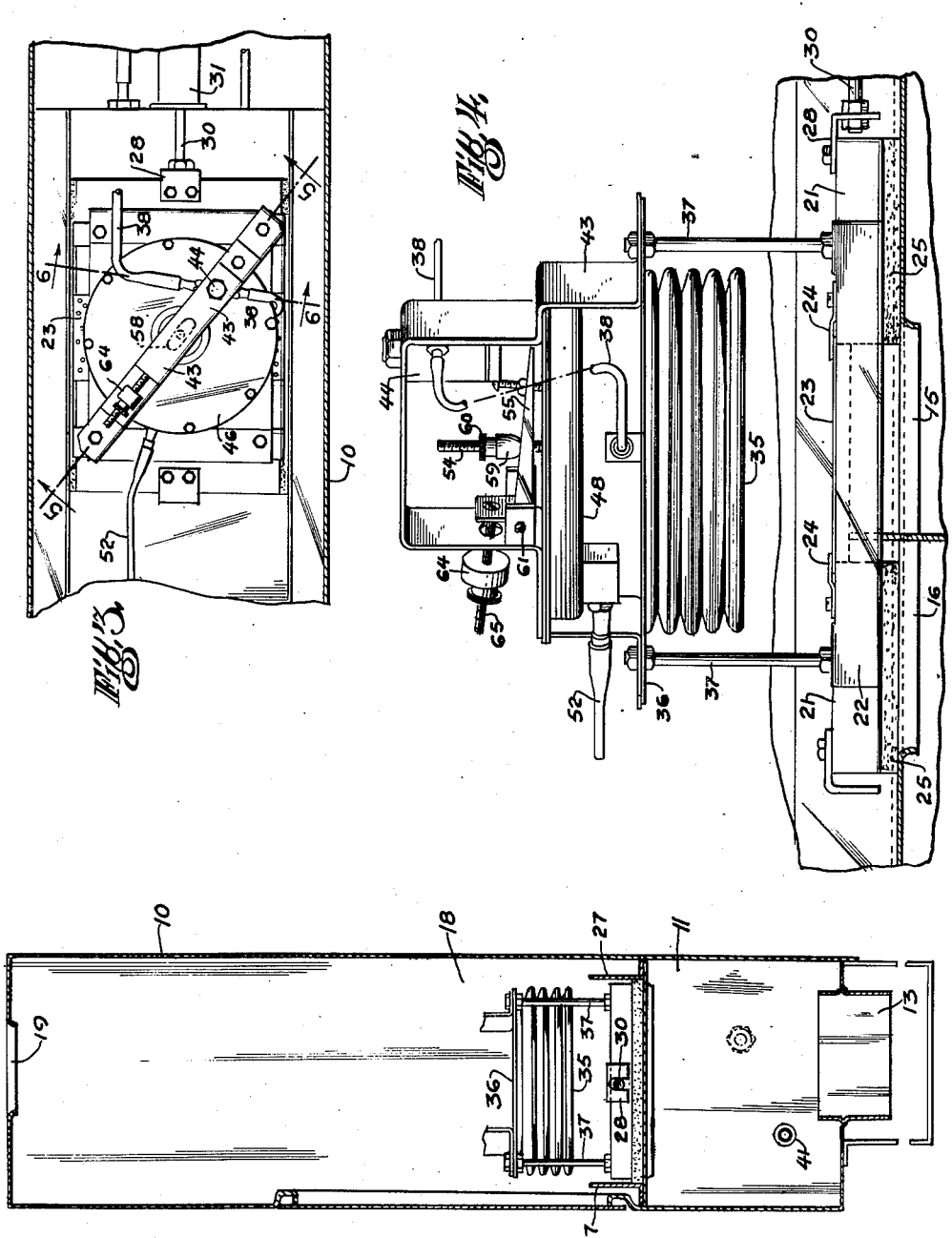

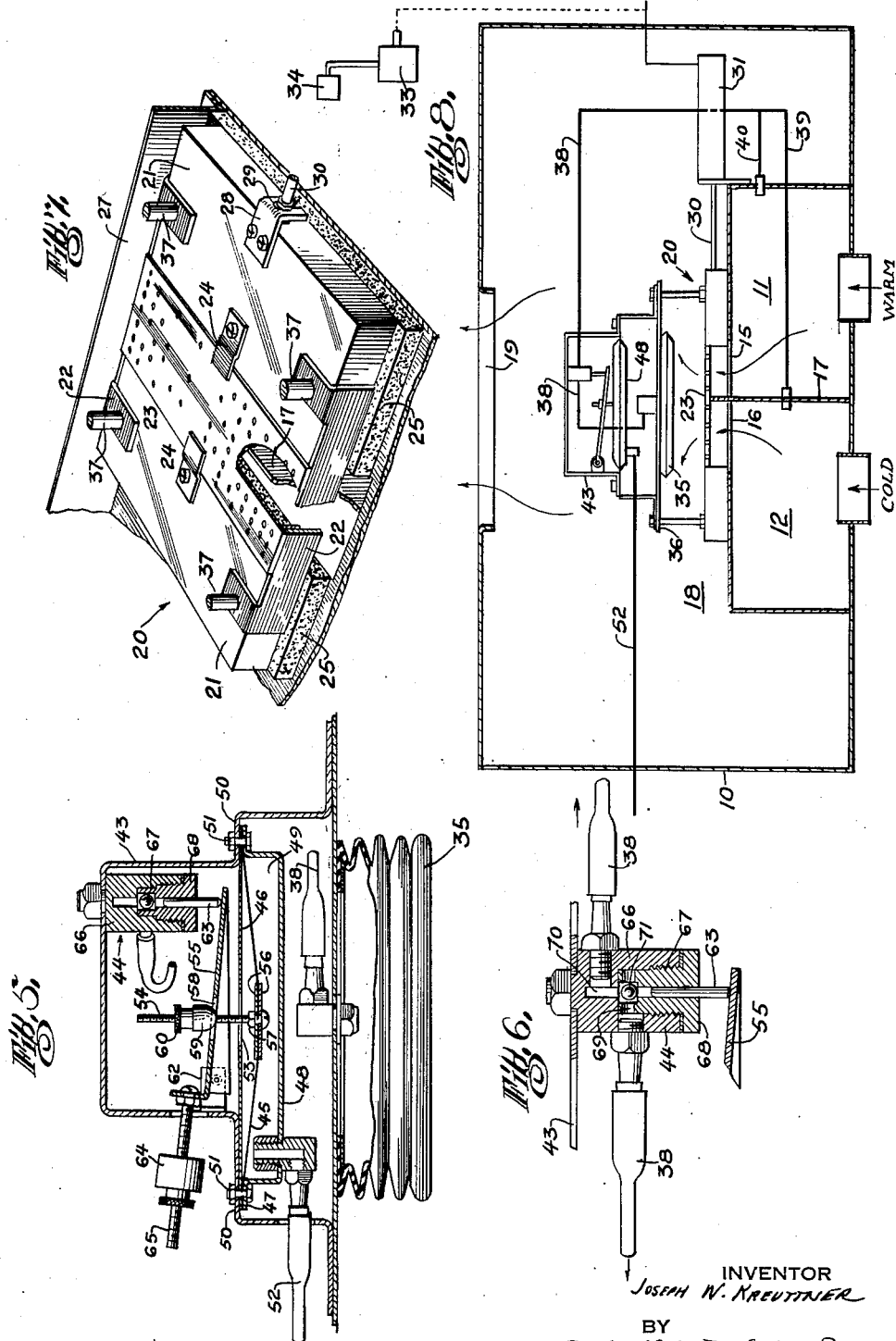

United States Patent Office 2,757,868
Patented Aug. 7, 1956

2,757,868

AIR CONDITIONING APPARATUS

Joseph W. Kreuttner, North Tarrytown, N. Y., assignor to Buensod-Stacey, Incorporated, New York, N. Y., a corporation of Delaware Application March 5, 1954, Serial No. 414,414

9 Claims. (Cl. 236—13)

This invention relates to new and improved air flow control devices for air conditioning systems wherein warm and cold air are supplied separately to a mixing and distributing unit in a zone or room being conditioned. The present invention is particularly adapted for high pressure air conditioning systems of this type, but it may be used to advantage for other systems. High pressure systems are those in which the pressure is over about 2 inches of water static pressure and the potential velocity of air in the air ducts is between about 1500 and 3500 feet per minute.

It is desirable in air conditioning systems of the aforementioned type that the air distributing units discharge air into the respective zones at a uniform rate, for it has been found that this will avoid the objectionable, audible noises commonly associated with operation of individual distributing units. This has been found to be particularly true of high pressure air distributing systems wherein pressure variations in the supply ducts are common and existing flow conditions in the supply ducts are often upset by frequent changes in the proportional amounts of air admitted from the warm and cold air supply ducts to bring or maintain the temperature of the air at selected values.

It is the principal object of this invention to provide new and improved flow control devices for air mixing and distributing units for air conditioning systems and the like, by which the temperature of the air distributed can be selected, set and maintained at any of a wide range of values, and by which the volumetric rate of air delivery can be maintained at a predetermined value, regardless of pressure changes and other variations in the air supply.

Another object of this invention is the provision of an easily adjustable proportioning damper and an air delivery volume controller in a compact integrated organization. A special feature of the invention lies in the arrangement by which such an organization may be freely removed and reinstalled in zone distributing units as a unit, without disassembling or re-assembling other parts of the distributing unit.

In a preferred aspect of the invention, a sliding damper is employed which is constructed and operated to open and close ports connected with warm and cold air supply ducts for respectively admitting warm and cold air into the mixing chamber of an air distributing box and for selectively proportioning the same. The damper is provided with apertures to register with the warm and cold air supply ports to establish communication between the respective supply ducts and the mixing chamber and is movable to vary the apertures open to the respective warm and cold air inlet openings so as to admit predetermined proportions of warm and cold air for discharging air at predetermined temperatures. The damper is further provided with a volume control regulator that is mounted on the damper for movement therewith and that utilizes air pressure from the supply ducts to operate a member movable to control the volume rate of flow through the apertures in the damper, the effective air pressure acting on the movable member being regulated by a pilot member responsive to pressure in the mixing chamber.

The damper member may comprise an apertured plate member removably disposed on a horizontal seat member in a position overlying ports connected with the warm and cold air supply ducts. The plate member is upwardly unconfined and is slidable horizontally on the laterally extending surface of the seat member to vary the apertures open to the respective ports so as to selectively proportion the amount of air admitted through each port. The plate is moved in a positive manner by a control motor having a plunger which is operatively engageable with the plate member when it is disposed in operative position on the seat member.

These and other objects, features and advantages of the invention will become apparent from the following detailed description of the accompanying drawings, which are merely exemplary.

In the drawings:

Figure 1 is a front elevation, partly broken away and with some interior parts shown in vertical section, of an air distributing unit embodying this invention;

Figure 2 is a vertical transverse cross section taken along line 2—2 of Figure 1;

Figure 3 is a fragmentary plan view of the damper assembly employed in the embodiment of Figure 1;

Figure 4 is an enlarged side elevation, partly in vertical section, of the damper assembly;

Figure 5 is a vertical section taken along line 5—5 of Figure 3;

Figure 6 is a vertical section through a pilot control valve of the invention taken along line 6—6 of Figure 3;

Figure 7 is a perspective view, partly broken away, of the damper; and

Figure 8 is a diagrammatic view of the distributing box illustrating the circuit connections for control elements of the invention.

Referring now to the drawings, 10 indicates an air mixing and distributing box for an air conditioning system that is adapted to be positioned in a zone or room to be conditioned, the box serving to mix warm and cold air delivered separately thereto in proper proportions for distribution into the zone at a proper temperature for maintaining the air in the zone at a predetermined temperature. The box is formed with two air receiving compartments 11 and 12 disposed adjacent to one another and having inlet openings 13 and 14, respectively, compartment 11 being adapted to be connected through opening 13 with a warm air supply duct and compartment 12 being adapted to be connected through opening 14 with a cold air supply duct. The chambers 11 and 12 are formed with top openings 15 and 16, respectively, for the upward passage of air from the respective compartments into a mixing chamber 18 in the box 10. The top openings are disposed adjacent to each other on opposite sides of a partition 17 separating the two compartments. Air is discharged into the zone from the unit 10 through opening 19 in the top wall thereof.

A slidable damper, generally indicated at 20, is employed to open and close top openings 15 and 16 for admitting warm and cold air into the mixing chamber 18 and for selectively proportioning the same. The damper 20, as clearly seen in Figure 7, includes a pair of sliding blocks 21, 21 that are held together in spaced relation by links 22, 22 which extend between and are fastened to adjacent side portions of the respective blocks on opposite sides of each block. A perforated plate 23 is carried between the blocks and bridges the space therebetween, the plate resting vertically on the upper free edges of links 22 and being held against upward displacement by spring clips 24 which are fastened to the blocks and overlap the respective adjoining edges of the plate. Felt bases 25, 25 are fastened to the bottoms of the blocks to afford easier sliding movement of the damper and may be readily replaced when worn.

The top wall of the compartments serves as a seat 26 on which the damper rests in a position overlying openings 15 and 16. The damper is confined fore and aft by two horizontal guide elements 27, 27 extending laterally on opposite sides of openings 15 and 16 in spaced relation thereto. The damper is slidable laterally along the length of said guide elements to register the apertures of the plate with openings 15 and 16 and to vary selectively the number of apertures open to each opening for proportioning the amounts of warm and cold air admitted into the mixing chamber 18. The width of the aperture plate 23 corresponds generally to the width or diameter of the top openings of the compartments so that the plate can be moved from one limiting position in which it fully opens one opening and fully closes the other to another limiting position in which it closes the one and fully opens the other. It will be obvious that the plate is movable between these two limiting positions to open partially both top openings to any desired ratio.

At one end of the damper, an angle piece 28 is affixed to a block 21 and projects laterally beyond the end thereof, its free arm being turned downwardly in spaced relation to the end of the block. This downwardly projecting arm is recessed upwardly at 29 so that when the plate is set in working position on seat 26, angle 28 operatively engages with a plunger 30, the latter being positioned to be received in recess 29 as the plate is lowered. Plunger 30 is operated by a thermostatically controlled motor 31 which may be either a conventional air motor or an electric motor, and is provided with abutment members 32 on opposite sides of the angle to transmit the motion of the plunger to the damper. In the form shown, the motor has a pressure relay 33 connected with a thermostat 34 suitably disposed in the zone or room being controlled.

In order to maintain a constant volumetric rate of air delivery through apertured plate 23 in accordance with the objects of this invention, the damper carries a compact flow control device which tends to restrict flow through the plate when pressure in the mixing chamber 18 increases and tends to increase flow through the plate when pressure in chamber 18 decreases, thereby maintaining the volume flowing into the room constant. By the present invention, the flow control device is an integrated part of the proportioning damper and, in the preferred form shown, includes a flexible bellows 35 which is movable toward and away from plate 23 as the pressure therein increases and decreases. The bellows is mounted on the underside of a frame 36 which is carried on four upright legs 37 which are fixed on lateral extensions of links 22.

The bellows motor 35 utilizes air from the supply ducts to operate the same, the bellows being connected to both the warm air supply chamber 11 and the cold air supply chamber 12 by a flexible fluid line 38 having branches 40 and 39 leading to the respective chambers. Branch 39 is received on a hose fitting 41 fixed in the partition 17 and having its open end communicating with chamber 12, and branch 40 is received on a hose fitting 42 fixed in a wall of chamber 11 and having its open end communicating therewith. It is obvious that the fluid supply to the bellows may be alternatively connected with only one of the air supply chambers.

The operating pressure in the bellows 35 is determined by a regulating device that is mounted above the bellows on a stepped bracket 43 fastened to frame 36 and that is responsive to the difference in pressure between the pressure in the mixing chamber 18 and the atmospheric pressure. The regulating device includes a valve 44 in the fluid line 38 operated by a pressure sensitive diaphragm 45. The diaphragm is a circular flexible piece which has its outer margins held between a flat circular rigid plate 46 and an annular laterally extending flange 47 of a cylindrical casing 48 that forms an enclosed pressure chamber 49 on the lower side of the diaphragm. The diaphragm organization is held in assembled relation and fastened to the underside of opposed laterally extending tread-like portions 50, 50 of the stepped bracket 43 as by rivets 51. Chamber 49 communicates with the atmosphere through a vent line 52 to expose the underside of the diaphragm to atmospheric pressure; plate 46 is open centrally at 53 to expose the upper side of the diaphragm to the pressure in mixing chamber 18.

The diaphragm carries a screw 54 which extends upwardly from the center of the diaphragm and serves as a connecting rod for transmitting downward motion of the diaphragm to a lever 55. Screw 54 extends through a central aperture in the diaphragm and also through centrally open washers 56, 56 on opposite sides of the diaphragm, these parts being held in assembled relation by a nut 57 threadedly received on screw 54. In upwardly spaced relation to this connection, the screw extends through a slot 58 in lever 55 and carries an adjustable nut 59, of a diameter greater than the width of the slot, which is positioned to operatively engage the lever to displace the same when the diaphragm is moved downwardly. A locking nut 60 is provided to lock nut 59 in set position. It will be apparent that since nut 59 is adjustable, its position can be selectively set in accordance with the range of operating pressures of the particular system with which the unit is associated.

Lever 55 is pivoted at 61 between a pair of pivot pins engaging the lever on opposite sides thereof, the pins being supported by a wall bracket 62 fixed to bracket 43. Lever 55 engages a plunger pin 63 of the valve member 44 on one side of its pivot and has an extension on the other side of the pivot to which is attached a counterweight 64, the latter being threaded to a laterally extending screw 65 so that its moment about the pivot may be readily adjusted.

The flow control valve member 44 in fluid line 38 includes a cylindrical body 66 having a recess 67 containing a plug 68. The plug is bored axially for slidably receiving the plunger 63 and is counterbored at its inner end to form a valve chamber. The valve is formed with a lateral port 69 for connection with that portion of the fluid line 38 leading to the bellows and an end port 70 for connection with that portion of the line 38 leading to the air supply chambers 11 and 12. A ball member 71 is disposed in the valve chamber in a position to be actuated by plunger 63 for opening and closing the port 70 that connects with supply chambers 11 and 12.

It will be seen that the biassing action of the counterweight 64 normally urges the lever 55 to a position holding the valve plunger 63 in a raised position in which the plunger holds the ball member 71 in a position closing port 70. Accordingly, the bellows is normally deflated so that the apertured plate 23 is normally fully open, thereby providing maximum flow therethrough. As the pressure in the mixing chamber increases, it is operable upon diaphragm 45 to displace the rod 54 downwardly. When the rod so moves, adjustable nut 59 engages lever 55 and overcomes the force of the counterweight and swings the lever clockwise about its pivot. This movement of the lever 48 relieves the upward force on the plunger 63 allowing the same to fall downwardly under its own weight so as to follow the movement of the lever. Of course, a spring member could be used to bias the plunger downwardly. This releases the force against ball 71, and the pressure in supply line 38 and gravity cause the ball to fall and thereby open port 70 to port 69. Fluid under pressure is then passed to the bellows inflating the same and causing the same to move toward apertured plate 23 so as to restrict flow through the plate in accordance with the pressure in chamber 18. In this way, as the static pressure in mixing chamber 18 increases due to increased volumetric flow through the damper, the flow control device operates to reduce such flow so as to maintain constant flow through plate 23.

It will be understood that the foregoing detailed description and the accompanying drawings are illustrative and that the improvements herein disclosed may be embodied in various forms of construction within the scope of the appended claims.

What is claimed is:

1. A damper assembly for an air conditioning distributing unit, comprising seat means having a laterally extending surface formed with two openings for upward passage of air into the distributing unit, said openings being connectable with two sources of air to be mixed, a removable horizontally slidable valve plate member to be seated on said seat means and to overlie said openings, said valve plate member having aperture means to register with said openings for admitting air from the respective openings into the distributing unit, said valve plate member being upwardly unconfined relative to said seat means and movable laterally on said surface to vary the aperture means open to the respective openings for selectively proportioning the amount of air admitted through each opening from each source, and said plate member including coupling means engageable with a plate-actuating member when said plate is seated on said seat means and being disengageable therefrom by upward movement of the plate.

2. A damper assembly for an air conditioning distributing unit, comprising seat means having a laterally extending valve seat surface formed with two openings for upward passage of air into the distributing unit from warm and cold air supply ducts, a removable horizontally slidable valve plate member seated on said seat means overlying said openings, said valve plate member having aperture means to register with said openings for admitting air from the respective openings and ducts into the distributing unit, said valve plate member being upwardly unconfined and movable laterally on said surface to vary the aperture means open to the respective openings for selectively proportioning the amount of air admitted through each opening, said plate member having means releasably attached with a plate-actuating member when said plate member is seated on said seat means, said plate actuating means being adapted to move said valve plate member, and volume control means mounted on said plate member for movement therewith and in spaced relation above the same, said volume control means including a yieldable member movable toward and away from said plate member aperture means to control the volume rate of flow therethrough.

3. A damper assembly for an air conditioning distributing unit having at least two air supply conduits leading thereto, means defining inlet ports and seat to connect with the respective conduits, fixed guideway means and seat extending laterally on opposite sides of said ports, a valve plate removably mounted on said guideway means to overlie said ports, said valve plate having aperture means to register with the ports for admitting air from the respective ports into the distributing unit, a plate-actuating member, said valve plate also having an end attachment releasably connectable with said plate-actuating member for moving the plate laterally on said guideway means and seat to vary the aperture means open to the respective ports and thereby selectively proportion the amount of air admitted from each port, volume control unit means mounted in spaced relation to the plate and its aperture means for movement with said plate, said unit means having fluid pressure operated means including a yieldable wall member movable to and from positions relative to the plate as the pressure in such volume control unit means increases and decreases to regulate the volume rate of flow through the valve plate aperture means.

4. A damper assembly for an air conditioning distributing unit having at least two air supply conduits leading thereto, means defining inlet ports and seat means to connect with the respective conduits, fixed horizontal guideway means extending laterally on opposite sides of said ports and seat means, a valve plate removably mounted on said guideway means to overlie said ports and seat, said valve plate having aperture means to register with the ports for admitting air from the respective ports into the distributing unit, a plate-actuating member, said valve plate also having an end attachment releasably connectable with said plate-actuating member for moving the plate laterally on said guideway means and seat means to vary the aperture means open to the respective ports and thereby selectively proportion the amount of air admitted from each port, said plate having vertically extending support members, fluid pressure operated means forming a volume control unit mounted on said support members for movement with said plate, said fluid pressure operated means having a yieldable wall member movable to and from positions relative to the plate and aperture means as the pressure in such means increases and decreases to regulate the volume rate of flow through the aperture means.

5. A damper assembly for an air conditioning distributing unit having at least two air supply conduits leading thereto, means defining inlet ports and seat to connect with the respective conduits, fixed guideway means extending laterally on opposite sides of said ports and seat, a valve plate removably mounted on said guideway means to overlie said ports and seat, said valve plate having aperture means to register with the ports for admitting air from the respective ports into the distributing unit, a plate-actuating member, said valve plate also having an end attachment releasably connectable wtih said plate-actuating member for moving the plate laterally on said guideway means to vary the aperture means open to the respective ports and thereby selectively proportion the amount of air admitted from each port, means forming a volume control unit mounted in spaced relation to the plate and for movement with said plate, said unit having fluid pressure operated means, means to supply fluid pressure thereto, a yieldable wall member movable to and from positions relative to the plate and said aperture means as the pressure in such fluid pressure operated means increases and decreases, and a pressure-responsive pilot valve associated with the fluid pressure supply means for varying the operating pressure in said fluid pressure operated means.

6. In an air conditioning distributing unit, air volume and temperature control means for an air conditioning unit and the like, the combination comprising an air mixing chamber, warm air and cold air inlet ports connected with valve seat means, a valve plate positioned adjacent said ports and slidable on said seat means and having aperture means to register with said ports for admitting air from the respective ports into the mixing chamber, said plate being movable to vary the aperture means open to the respective ports for selectively proportioning the amount of air admitted from each port, and fluid pressure operated means mounted on and in spaced relation to the plate and for movement therewith having a yieldable wall member movable to and from positions relative to the plate aperture means as the pressure in said fluid pressure operated means increases and decreases so as to control the volume rate of flow through the plate aperture means.

7. In an air conditioning distributing unit, air volume and temperature control means for an air conditioning unit and the like, the combination comprising an air mixing chamber, warm air and cold air inlet ports to connect with warm and cold air supply conduits, a valve plate positioned adjacent said ports and having aperture means to register with said ports for admitting air from the respective ports into the mixing chamber, said plate being movable to vary the aperture means open to the respective ports for selectively proportioning the amount of air admitted from each port, flow control means mounted in spaced relation to said plate and for movement therewith, said flow control means including fluid pressure operated means connected with said supply ducts and having a yieldable member movable relative to said plate to control flow through the plate, and means responsive to pressure changes in said mixing chamber to vary the pressure acting on said fluid pressure operated means proportionally to said changes so as to maintain a constant volumetric rate of flow through the plate.

8. In an air conditioning distributing unit, air volume and temperature control means for an air conditioning unit and the like, the combination comprising an air mixing chamber, warm air and cold air inlet ports to connect with warm and cold air supply conduits, a valve plate positioned adjacent said ports and having aperture means to register with said ports for admitting air from the respective ports into the mixing chamber, said plate being movable to vary the aperture means open to the respective ports for selectively proportioning the amount of air admitted from each port, ambient temperature responsive thermostat control means connected with said valve plate, flow control means mounted in spaced relation to said plate and for movement therewith, said flow control means including fluid pressure operated means connected with said supply ducts and having a yieldable member movable relative to said plate to control flow through the plate, and means responsive to pressure changes in said mixing chamber to vary the pressure acting on said fluid pressure operated means proportionally to said changes so as to maintain a constant volumetric rate of flow through the plate.

9. In an air conditioning distributing unit, air volume and temperature control means for an air conditioning unit and the like, the combination comprising an air mixing chamber, warm air and cold air inlet ports to connect with warm and cold air supply conduits, a valve plate positioned adjacent said ports and having aperture means to register with said ports for admitting air from the respective ports into the mixing chamber, said plate being movable to vary the aperture means open to the respective ports for selectively proportioning the amount of air admitted from each port, flow control means mounted in spaced relation to the plate and for movement therewith, said flow control means including fluid pressure operated means having a fluid connection with at least one of the supply conduits, a yieldable wall member movable to and from positions relative to the plate as the pressure in said fluid pressure operated means increases and decreases so as to control the volume rate of flow through the plate, and a pressure responsive valve member associated with said fluid connection and responsive to pressure changes in said mixing chamber to vary the pressure supply to said fluid pressure responsive means in a manner to maintain constant volumetric rate of flow through the valve plate.

References Cited in the file of this patent

UNITED STATES PATENTS

| | | |
|---|---|---|
| 2,211,481 | Scott | Aug. 13, 1940 |
| 2,401,890 | Smith | June 11, 1946 |
| 2,670,900 | Branson | Mar. 2, 1954 |